United States Patent [19]

Tokura et al.

[11] 4,074,975
[45] Feb. 21, 1978

[54] COMBINATION EXHAUST-GAS CLEANER AND MUFFLER FOR AN AUTOMOBILE ENGINE

[75] Inventors: Naomi Tokura, Yokosuka; Kenji Masaki, Yokohama; Hatuo Nagaisi, Yokosuka, all of Japan

[73] Assignee: Nissan Motor Company, Limited, Japan

[21] Appl. No.: 643,702

[22] Filed: Dec. 23, 1975

Related U.S. Application Data

[63] Continuation-in-part of Ser. No. 466,879, May 3, 1974, abandoned.

[30] Foreign Application Priority Data

May 7, 1973 Japan .............................. 48-53449[U]
June 18, 1973 Japan ........................... 48-719380[U]

[51] Int. Cl.² .......................... B01J 8/00; F01N 3/15; B01D 45/12; B01D 51/02
[52] U.S. Cl. .................................... 23/288 F; 55/276; 55/346; 55/385 R; 55/447; 55/DIG. 25; 55/DIG. 30; 60/297; 60/311; 181/272
[58] Field of Search ................. 55/276, 319, 349, 410, 55/459 R, DIG. 30, 346, 347, 348, 447, 448–450, 456, 457, DIG. 25, 385 R, 385 B; 181/58, 59, 36 B, 36 C; 60/297, 311, 312; 23/288 F

[56] References Cited

U.S. PATENT DOCUMENTS

| 2,075,264 | 3/1937 | Bourne et al. ................ 55/276 X |
| 2,329,101 | 9/1943 | Chipley ............................ 55/276 |
| 2,958,389 | 11/1960 | Deremer ..................... 181/59 X |
| 3,056,662 | 10/1962 | Ridgway ................. 181/36 C X |
| 3,082,840 | 3/1963 | Reindl ......................... 181/58 X |
| 3,257,798 | 6/1966 | Hass ...................... 55/DIG. 30 X |
| 3,279,560 | 10/1966 | Hubrich ....................... 55/276 X |
| 3,397,034 | 8/1968 | Tulleners et al. ............ 60/297 X |
| 3,479,145 | 11/1969 | Lentz ........................ 181/36 C X |
| 3,495,401 | 2/1970 | Lenane ................... 55/385 B X |
| 3,738,085 | 6/1973 | Nishinomiya ............... 55/276 X |
| 3,815,337 | 6/1974 | Lenane ............................ 55/276 |
| 3,815,338 | 6/1974 | Lenane ............................ 55/276 |
| 3,822,531 | 7/1974 | Wisnewski et al. ...... 55/DIG. 30 X |
| 3,960,528 | 6/1976 | Jacobs et al. ................... 55/346 |

FOREIGN PATENT DOCUMENTS

| 229,786 | 10/1959 | Australia ........................ 55/276 |
| 802,205 | 2/1951 | Germany ......................... 181/58 |

*Primary Examiner*—Frank W. Lutter
*Assistant Examiner*—Kathleen J. Prunner

[57] ABSTRACT

A combination exhaust-gas cleaner and muffler for particular use in an exhaust system of an automotive engine incorporating in the exhaust system a catalytic converter using a granular catalyst which is responsible for emission of dust particles of oxides of base or noble metal, comprising at least one centrifugal separator for separating the dust particles from the exhaust gases by imparting a centrifugal force to the stream of the exhaust gases, a dust collection chamber communicating with the centrifugal separator for collecting therein the dust particles separated from the exhaust gases and at least one silencer chamber also in communication with the centrifugal separator for dampening out noises which are borne by the exhaust gases. For the purpose of growing up the ultrafine dust into coarse particles, a particle growing chamber stuffed with a flocculent metallic material such as steel wool may be located upstream of the centrifugal separator.

21 Claims, 10 Drawing Figures

COMBINATION EXHAUST-GAS CLEANER AND MUFFLER FOR AN AUTOMOBILE ENGINE

This application is a continuation-in-part of our application Ser. No. 466,879 filed May 3, 1974 and now abandoned.

The present invention relates to a combined assembly of an exhaust-gas cleaner and a muffler for use in an exhaust system of an engine such as an internal combustion engine of an automotive vehicle. More particularly, the present invention is concerned with a combination exhaust-gas cleaner and muffler for use in an automotive exhaust system of the specific character which has incorporated therein a catalytic converter adapted to convert into harmless gases those toxic compounds such as unburned hydrocarbons and carbon monoxide or nitrogen oxides which are contained in exhaust gases emitted from the automotive engine.

The catalytic converter for cleaning up the exhaust gases from an automotive engine usually uses a granular catalyst of an oxide of base or noble metal. One problem encountered by the catalytic converter of such a type is that the particles of the metal oxide making up the granular catalyst tend to wear due to attrition and impingement between the particles and also the abrasion of the particles contacting an enclosure or casing of the converter as caused by the pulsation of the stream of the exhaust gases and the vibrations of the converter casing. Ultrafine powder of the metal oxide is thus admixed to and entrained in the exhaust gases and is discharged to the open air together with the exhaust gases. The granular catalyst employed in the catalytic converter is usually composed of an oxide or oxides of base metal such as copper, chromium, manganese, nickel, iron, vanadium or a combination of any two or more of these or of noble metal such as platinum, palladium or a combination of the two. If the ultrafine powder of such a metal oxide is admitted to the open air, there will arise a secondary air-pollution problem although the emission of the toxic compounds such as hydrocarbons and carbon monoxide or nitrogen oxides causing a "primary" air pollution may be eliminated. Where the catalytic converter using the granular catalyst of the metal oxide is used on the exhaust system of an automotive engine, it has therefore been proposed to have a filter located downstream of the catalytic converter for the purpose of collecting the ultrafine particles of the metal oxide dislodged from the converter. Not only strict restrictions are imposed on the layout of the exhaust system as a whole but a significant increase in the exhaust back pressure is invited as a result of the provision of such a filter in the exhaust system, eventually impairing the performance efficiency of the engine. The present invention contemplates elimination of all these problems that have thus far been encountered in the automotive engine exhaust system equipped with the catalytic converter using the granular catalyst of the oxide of base or noble metal.

It is, accordingly, an important object of the present invention to provide means adapted to collect ultrafine particles of metal oxide which are freed from a catalytic converter using a granular catalyst.

It is another important object of the invention to provide means adapted to collect ultrafine particles of metal oxide contained in exhaust gases passed through the catalytic converter and at the same time to dampen noises which are borne by the exhaust gases.

It is still another important object of the invention to provide a combination exhaust-gas cleaner and muffler which is ready to be mounted on an exhaust system of an automotive vehicle and which is capable of providing satisfactory dust collection and noise silencing efficiencies.

It is, thus, a general object of the present invention to provide an arrangement which is adapted to eliminate noxious compounds such as hydrocarbons, carbon monoxide and nitrogen oxides in exhaust gases from an automobile engine through use of a catalytic converter using a granular catalyst, to collect ultrafine particles of toxic metal oxide emitted from the catalytic converter, and simultaneously to dampen out noises which are borne by the exhaust gases.

In accordance with the present invention, these and other objects will be accomplished basically in a combination exhaust-gas cleaner and muffler comprising an inlet tube which is located downstream of the catalytic converter so that a stream of exhaust gases entraining dust particles is admitted into the inlet tube from the catalytic converter, an outlet tube for discharging a stream of exhaust gases cleared of the dust particles and noises, at least one centrifugal separator which is positioned between the inlet and outlet tubes for imparting a centrifugal force to the stream of the exhaust gases admitted thereto and thereby separating the dust particles from the exhaust gases under the influence of the centrifugal force, the centrifugal separator having a gas inlet opening which is in communication with the inlet tube for delivering the stream of the exhaust gases into the centrifugal separator from the inlet tube, a dust discharge opening for discharging from the centrifugal separator the dust particles separated from the exhaust gases in the separator and a gas discharge opening for discharging from the separator the stream of the exhaust gases cleared of the dust particles, a dust collection chamber in communication with the centrifugal separator through the dust discharge opening for depositing in the dust collection chamber the dust particles discharged from the separator, and at least one silencer chamber which is located between the gas discharge opening of the centrifugal separator and the outlet tube for dampening the noises borne by the exhaust gases passed through the silencer chamber.

The centrifugal separator incorporated into the combination exhaust-gas cleaner and muffler thus constructed may be of the tangential type in which the gas inlet opening thereof is directed tangentially to the separator and in which the gas and dust discharge openings of the separator are axially spaced apart from and directed in opposite directions to each other. As an alternative, the centrifugal separator may be of the axial-flow forward-advance type in which the gas inlet and discharge openings thereof are axially spaced apart from each other and in which the dust discharge opening of the separator is located radially outwardly of the gas discharge opening. Or otherwise, the centrifugal separator may be of the axial-flow reverse-advance type in which the gas discharge opening thereof is located radially inwardly of the gas inlet opening and in which the dust discharge opening of the separator is axially spaced apart from the gas inlet and discharge openings and directed in the same direction as the gas inlet opening and in the opposite direction to the gas discharge opening.

To reduce the resistance to be imparted to the stream of the exhaust gases delivered to the centrifugal separator for thereby reducing the exhaust back pressure and to slow down the stream of the exhaust gases through the centrifugal separator for thereby preventing development of a turbulent flow in the separator, the combination exhaust-gas cleaner and muffler may comprise two or even more centrifugal separators. Where the stream of the exhaust gases is turned back, as in the centrifugal separator of the tangential type or the axial-flow reverse-advance type, the provision of the two or more separators will facilitate the turning back of the stream of the exhaust gases as will be understood as the description proceeds.

If desired, two or even more of the silencer chambers may be incorporated into the combination exhaust-gas cleaner and muffler. Where two silencer chambers are to be provided, a first silencer chamber is positioned immediately downstream of the gas discharge opening of the centrifugal separator and a second silencer chamber is positioned intermediate between the first silencer chamber and the outlet tube or, otherwise, a first silencer chamber is positioned intermediate between the inlet tube and the gas inlet opening of the centrifugal separator and a second silencer chamber is positioned intermediate between the gas discharge opening of the separator and the outlet tube. In whichsoever instance, the first silencer chamber may be arranged to be of the expansion type whereas the second silencer chamber may be arranged to be of either the resonance type or the combined expansion and resonance type. If, on the other hand, three silencer chambers are to be provided, a first silencer chamber is positioned intermediate between the inlet tube and the gas inlet opening of the centrifugal separator, a second silencer chamber is positioned immediately downstream of the gas discharge opening of the separator, and a third silencer chamber is positioned intermediate between the second silencer chamber and the outlet tube. Or otherwise, the centrifugal separator may be formed with first and second gas discharge openings which are in communication with the exhaust outlet tube so that the second silencer chamber is positioned intermediate between the first gas discharge opening of the centrifugal separator and the exhaust outlet tube and the third silencer chamber is positioned intermediate between the second gas discharge opening of the centrifugal separator and the exhaust outlet tube whereby the stream of exhaust gases in the centrifugal separator is, when discharged therefrom, divided into a first stream flowing through the second silencer chamber and a second stream flowing through the third silencer chamber before the exhaust gases are admitted into the exhaust outlet tube. In whichsoever instance, the first silencer chamber may be arranged to be of the expansion type whereas the second and third silencer chambers may be arranged to be of any of the expansion type, the resonance type, or the combined expansion and resonance type.

The exhaust gases delivered to the combination cleaner and muffler will contain not only the particles of the metal oxide dislodged from the catalytic converter but other fine particles such as for example plumbous compounds and soot produced by the combustion of the fuel in the engine. All these particles are repeatedly adhered to and peeled from surfaces defining passages of the exhaust gases and are thereby "grown" into coarse particles which are easier to be separated from the exhaust gases. An increased dust collection efficiency will therefore be achieved by the centrifugal separator of the combination exhaust-gas cleaner and muffler if means adapted to positively grow the finer particles into the coarse ones before the particles are thrown into the centrifugal separator. Thus, the combination exhaust-gas cleaner and muffler according to the present invention may further comprise a particle growing chamber which is located intermediate between the inlet tube and the gas inlet opening of the centrifugal separator and which is stuffed with a flocculent metallic material such as steel wool and apertured partition members which are located at inlet and outlet ends of the particle growing chamber.

The feature of the combination exhaust-gas cleaner and muffler according to the present invention will become more apparent from the following description taken in conjunction with the accompanying drawings in which like reference numerals designate similar units and members and in which.

Figure 1:
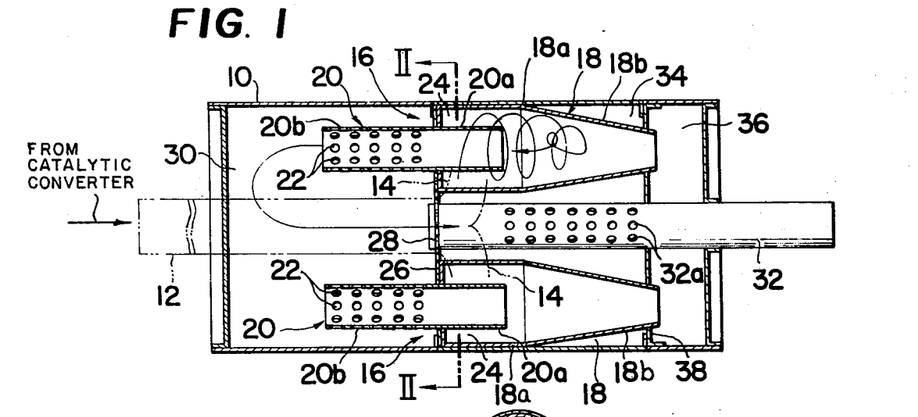
FIG. 1 is a longitudinal sectional view which shows a first preferred embodiment of the combination exhaust-gas cleaner and muffler according to the present invention.
Figure 3:
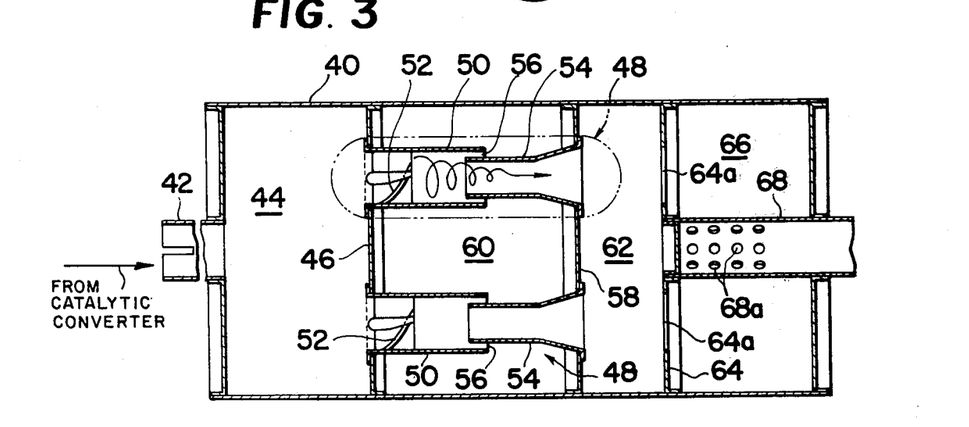
FIGS. 3, 4 and 5 are views which are similar to FIG. 1 but which illustrate second, third and fourth preferred embodiments, respectively, of the combination exhaust-gas cleaner and muffler according to the present invention.
Figure 4:
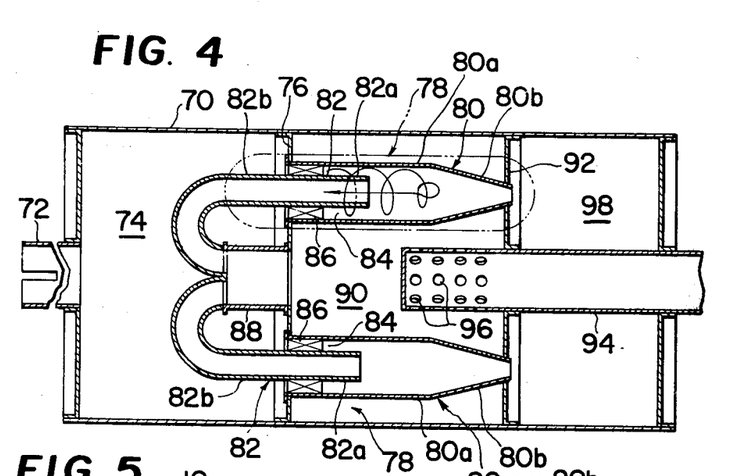
Figure 5:
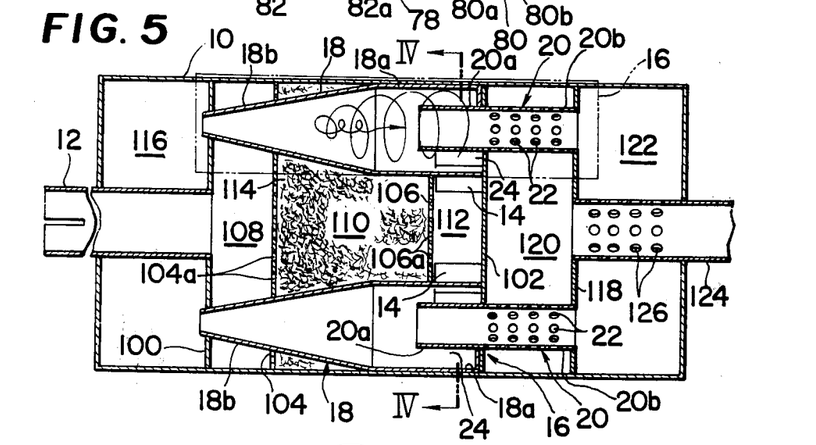
Figure 7:
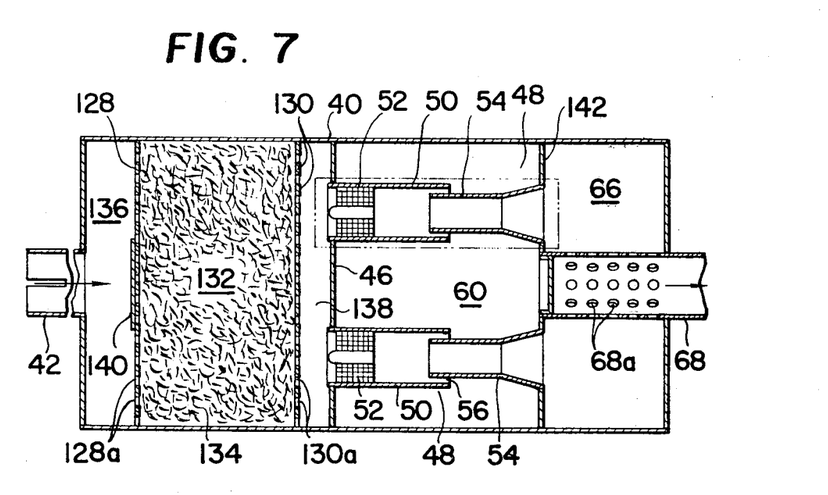
FIGS. 7 and 8 are views which are also similar to FIG. 1 but which illustrate fifth and sixth preferred embodiments, respectively, of the combination exhaust-gas cleaner and muffler according to the present invention.
Figure 8:
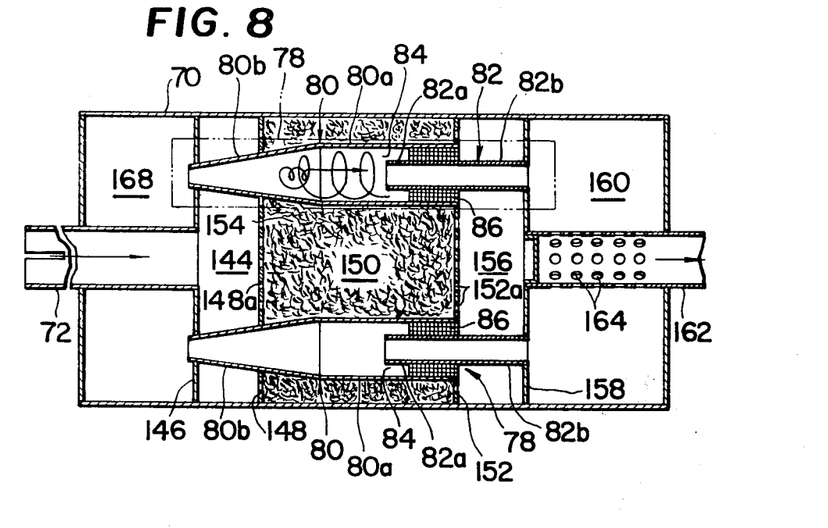

Of the various embodiments of the present invention as above recited, the first and fourth embodiments illustrated in FIGS. 1 and 5, respectively, are those which use centrifugal separators of the tangential types, the second and fifth embodiments illustrated in FIGS. 3 and 7, respectively, are those which use centrifugal separators of the axial-flow forward-advance types, and the third and sixth embodiments illustrated in FIGS. 4 and 8, respectively, are those which use centrifugal separators of the axial-flow reverse-advance types. In another aspect, the first to third embodiments are those which are void of means to positively grow the ultrafine particles whereas the fourth to sixth embodiments are those which have incorporated therein the means having such a function.

Figure 2:
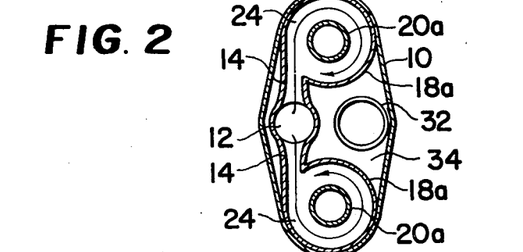
FIG. 2 is a cross sectional view taken on line II—II of FIG. 1.

Reference will now be made to the drawings, first concurrently to FIGS. 1 and 2. The first preferred embodiment of the combination exhaust-gas cleaner and muffler according to the present invention comprises a casing 10 which is shown in FIG. 2 as having a generally oval cross section. The casing 10 is in constant communication through an exhaust inlet tube 12 with a catalytic converter (not shown) which is mounted in an exhaust system of an automotive engine (not shown). The exhaust inlet tube 12 opens into a longitudinally intermediate portion of the casing 10 and is branched into a pair of branch ducts 14 which extend substantially in parallel to a major axis of the oval cross section of the casing 10. The branch ducts 14 are respectively connected to centrifugal separators 16 which are positioned in parallel to a longitudinal axis of the casing 10 as seen in FIG. 1. Each of the centrifugal separators 16 is arranged to be of the tangential type and is made up of a swirling tube 18 and a gas discharge tube 20. The swirling tube 18 has a cylindrical portion 18a and a conical portion 18b merging out of the cylindrical portion 18a and open at its reduced end. The gas discharge tube 20 has a longitudinal end portion 20a concentrically located within and radially inwardly spaced apart from the cylindrical portion 18a of the swirling tube 18 and a remaining longitudinal portion 20b axially extending out of the cylindrical portion 18a of the swirling tube 18 and formed with a number of apertures or vents 22. Between the cylindrical portion 18a of the swirling tube 18 and the longitudinal end portion 20a of the gas discharge tube 20 is thus formed an annular space 24 into which the duct 14 tangentially opens as seen in FIG. 2. The swirling tubes 18 and the gas discharge tubes 20 are supported by a partition member 26 which is rigidly connected to the casing 10 and which is formed with apertures 28 in its central portion for the reason which will be understood as the description proceeds.

The partition member 26 defines in the casing 10 an expansion type silencer chamber 30 into which the apertured longitudinal portions 20b of the gas discharge tubes 20 of the centrifugal separators 16 project. The expansion type silencer chamber 30 is in communication through the apertures 28 in the partition member 26 with an exhaust outlet tube 32 which axially projects outwardly of the casing 10. Within the casing 10, the exhaust outlet tube 32 is surrounded by a resonance type silencer chamber 34 and a dust collection chamber 36 which are separated from each other by a partition member 38 which is fastened to the casing 10. The dust collection chamber 36 is so defined to have sufficient space therein in order to act as a resonance type silencer chamber. The exhaust outlet tube 32 has formed in its longitudinal portion extending through the resonance type silencer chamber 34 a number of apertures 32a through which communication is constantly established between the exhaust outlet tube 32 and the silencer chamber 34. Into the dust collection chamber 36 do project the reduced ends of the conical portions 18b of the swirling tubes 18 of the centrifugal separator 16.

In operation, a stream of exhaust gases delivered from the catalytic converter in the exhaust system of the engine is admitted to the exhaust inlet tube 12 and, from the tube 12, divided into two separate streams by the branch ducts 14 in the casing, and is tangentially fed into the annular space 24 between the cylindrical portion 18a of the swirling tube 18 and the longitudinal end portion 20a of the gas discharge tube 20 of each of the centrifugal separators 16 and is thus given a swirling motion around the end portion 20a of the exhaust discharge tube 20. The stream of the exhaust gases is thus caused to swirl about an axis of the swirling tube 18 while advancing toward the reduced end of the conical portion 18b of the swirling tube 18. A centrifugal force is consequently imparted to the stream of exhaust gases advancing toward the reduced end of the conical portion 18b so that the dust particles having relatively large mass are caused to move toward the inner peripheral surface of the conical portion 18b. The dust particles are thus deposited on the inner peripheral surface of the conical portion 18b of the swirling tube 18, moved along the peripheral surface toward the reduced end of the conical portion 18b, and finally discharged into the dust collection chamber 36.

As a result of development of a vortex flow in the swirling tube 18, the gas pressure decreases along the axis of the swirling tube 18 so that the gases are urged toward the axis of the vortex and, as a consequence, the stream of the exhaust gases is turned back away from the reduced end of the conical portion 18b of the swirling tube 18 as indicated by an arrowhead in FIG. 1. During this turning back proceeding of the stream of the exhaust gases, the noises borne by the exhaust gases are primarily dampened by the noise dampening effect of the prior mentioned dust collection chamber 36. The stream of exhaust gases cleared of the dust particles is admitted into the gas discharge tube 20 and from the tube 20 debouched into the expansion type silencer chamber 30 through the open end and the apertures 22 in the tube 20 so that the noises born by the exhaust gases are secondarily dampened out. The exhaust gases are then delivered to the exhaust outlet tube 32 through the apertures 28 in the partition member 26 and are thirdly muffled by the resonance type silencer chamber 34 surrounding the exhaust outlet tube 32 while the gases are being passed through the apertured longitudinal portion of the exhaust outlet tube 32.

Referring to FIG. 3, the second preferred embodiment of the combination exhaust-gas cleaner end muffler according to the present invention comprises a casing 40 which communicates at its upstream and with the catalytic converter (not shown) of the engine exhaust system through an exhaust inlet tube 42. The exhaust inlet tube 42 opens into an expansion type silencer chamber 44 which is defined between an end wall of the casing 40 and a partition member 46 which is rigidly connected to the casing. Within the casing 40 are positioned a pair of axial-flow forward-advance centrifugal separators 48 in parallel to a longitudinal axis of the casing 40. Each of the centrifugal separators 48 is made up of a swirling tube 50 supported on the partition member 46 and having an inlet end open to the silencer chamber 44, a flow directing or swirling blade 52 located at the inlet end of the swirling tube 50, and a gas discharge tube 54 having a rear end portion located within and radially inwardly spaced apart from a forward end portion of the swirling tube 50. An annular spacing 56 is thus provided between the longitudinally overlapping end portions of the swirling and gas discharge tubes 50 and 54, respectively. The gas discharge tubes 54 of the centrifugal separators 48 are supported by a partition member 58 which is spaced apart from the partition member 46 and which is rigidly connected to the casing 40. Between the two partition members 46 and 58 is thus formed a dust collection chamber 60 surrounding the swirling tubes 50 and the gas discharge tubes 54 of the centrifugal separators 48. The annular spacing 56 formed between the longitudinally overlapping end portions of the swirling and gas discharge tubes 50 and 54, respectively, of each of the centrifugal separators 48 is thus open to the dust collection chamber 60. It is now to be noted that the dust collection chamber 60 is so formed to have sufficient space therein to act as a resonance type silencer.

The gas discharge tubes 54 of the centrifugal separators 48 have flaring forward end portions which are open into an expansion type silencer chamber 62 which is defined between the partition member 58 and a partition member 64 spaced apart from the former. The partition member 64 is formed with apertures 64a and, through these apertures, the expansion type silencer chamber 62 is in communication with a combination expansion and resonance type silencer chamber 66 which is defined between the partition member 64 and a forward end wall of the casing 40. An exhaust outlet tube 68 is connected at one end to the partition member 64 and axially project outwardly of the casing 40. The exhaust outlet tube 68 has formed in its longitudinal portion extending through the combination expansion and resonance type silencer chamber 66 a number of apertures 68a through which communication is provided between the silencer chamber 66 and the exhaust outlet tube 68.

In operation, a stream of exhaust gases delivered from the catalytic converter positioned upstream of the combination exhaust-gas cleaner and muffler is admitted into the exhaust inlet tube 42 and through the inlet tube debouched into the first expansion type silencer chamber 44. The exhaust gases thus entering the silencer chamber 44 are expanded and stirred therein so that the noises born thereby are primarily dampened. The exhaust gases are then admitted to the swirling tubes 50 of the two centrifugal separators 48 and are thus given swirling motions by the flow directing or swirling blades 52 located in the inlet ends of the swirling tubes 50. A vortex flow of the exhaust gases is thus built up in each of the swirling tubes 50 so that a centrifugal force is imparted to the stream of the exhaust gases advancing in the swirling tube 50 toward the associated gas discharge tube 54. The dust particles which are entrained in the stream of the exhaust gases thus swirled are radially outwardly urged toward an inner peripheral surface of the swirling tube 50 and are consequently discharged into the dust collection chamber 60 through the annular spacing 56 between the swirling and gas discharge tubes 50 and 54, respectively. The stream of the exhaust gases cleared of the dust particles in this manner is withdrawn from the swirling tube 50, advances into the gas discharge tube 54, and are finally admitted into the second expansion type silencer chamber 62 from the flaring forward end of the gas discharge tube 54. During this proceeding of the stream of the exhaust gases in the centrifugal separator 48, the noises borne by the exhaust gases are secondarily dampened by the noise dampening effect of the collection chamber 60. The noises are then thirdly dampened in the expansion type silencer chamber 62. The stream of the exhaust gases is then passed to the combination expansion and resonance type silencer chamber 66 through the apertures 64a formed in the partition member 64 and is finally muffled therein. The exhaust gases are then circulated to the exhaust outlet tube 68 through the apertures 68a in the tube 68 and, through this tube, withdrawn to the open air. The axial-flow forward-advance type centrifugal separators used in the embodiment above described have features such as minimized resistances to the flows of gases and relatively small-sized constructions and will thus prove advantageous for the purpose of reducing the exhaust back pressure and alleviating the space requirement of the exhaust system.

FIG. 4 illustrates the third preferred embodiment of the combination exhaust-gas cleaner and muffler according to the present invention. As illustrated, the combination cleaner and muffler comprises a casing 70 which is in communication at its upstream end with the catalytic converter (not shown) of the exhaust system through an exhaust inlet tube 72. The exhaust inlet tube 72 opens into an expansion type silencer chamber 74 which is defined between an end wall of the casing 70 and a partition member 76 which is rigidly connected to the casing 70. A pair of axial-flow reverse-advance centrifugal separators 78 are positioned within the casing 70 in parallel to a longitudinal axis of the casing 70. Each of the centrifugal separators 78 is made up of a swirling tube 80 which consists of a cylindrical portion 80a and a conical portion 80b having a reduced end and a gas discharge tube 82 having a longitudinal end portion 82a located within and radially inwardly spaced apart from the cylindrical portion 80a of the swirling tube 80 and a longitudinal portion 82b axially projecting out of the cylindrical portion 80a of the swirling tube 80. An annular spacing 84 is thus formed between the longitudinally overlapping portions of the cylindrical portion 80a of the swirling tube 80 and the end portion 82a of the gas discharge tube 82 in each of the centrifugal separators 78. Flow directing or swirling blades 86 are located in this annular spacing 84 so that a stream of gases entering the centrifugal separator 78 from the silencer chamber 74 is twisted around the inner end portion 82a of the gas discharge tube 82. The outer longitudinal portions 82b of the gas discharge tubes 82 of the two centrifugal separators 78 project into the expansion type silencer chamber 74 and are curved and turned back halfway of the silencer chamber 74, terminating in a common duct 88 which is supported by the partition member 76. The duct 88 opens into a combination expansion and resonance type silencer chamber 90 which defined between the partition member 76 and a second partition member 92 spaced apart from the former and rigidly connected to the casing 70. An exhaust outlet tube 94 leads from the interior of the silencer chamber 90 and axially projects outwardly of the casing 70. The exhaust outlet tube 94 is formed with a number of apertures 96 which project communication between the silencer chamber 90 and the exhaust outlet tube 94. Adjacent to the combination expansion and resonance silencer chamber 90 is located a dust collection chamber 98 which is defined between the partition member 92 and an end wall of the casing 70. The conical portions 80b of the swirling tubes 80 of the centrifugal separators 78 are open into this dust collection chamber 98 through their respective reduced ends and the exhaust outlet tube 94 has its intermediate portion extending throughout the dust collection chamber 98 as shown. As prior mentioned, the dust collection chamber 98 is so arranged to have sufficient space to act as a resonance type silencer.

In operation, the stream of exhaust gases delivered from the catalytic converter of the exhaust system is passed to the exhaust inlet tube 72 and, through this inlet tube, admitted into the expansion type silencer chamber 74. The exhaust gases are thus expanded and stirred in the silencer chamber 74 so that the noises borne by the exhaust gases are primarily dampened while the stream of the gases stay in the silencer chamber 74. The exhaust gases are then admitted to the annular spacings 84 between the swirling tubes 80 and the gas discharge tubes 82 of the axial-flow reverse-advance centrifugal separators 78 so that the stream of exhaust gases is given a swirling motion by means of the flow directing or swirling blades 86 located in the annular spacings 84. As a consequence, the stream of exhaust gases in each of the centrifugal separators 78 is caused to swirl about an axis of the cylindrical portion 80a of the swirling tube 80 with the result that the dust particles entrained in the stream of the gases are moved radially outwardly toward an inner peripheral surface of the cylindrical portion 80a and thereafter an inner peripheral surface of the conical portion 80b of the swirling tube 80 under the influence of a centrifugal force imparted to the stream of the exhaust gases. The dust particles are in this manner separated from the stream of the exhaust gases and are finally discharged into the dust collection chamber 98 through the reduced end of the conical portion 80b of the swirling tube 80. As a result of development of the vortex flow in the swirling tube 80, a drop of pressure is invited along the longitudinal axis of the swirling tube 80 so that the stream of the exhaust gases advancing halfway of the swirling tube 80 is sucked in and directed into the gas discharge tube 82 as indicated by an arrowhead in FIG. 4. During this proceeding of the stream of the exhaust gases in the swirling tube 80, the noises borne by the exhaust gases are secondarily dampened by the dust collection chamber 98. The streams of the exhaust gases cleared of the dust particles are in this manner passed to the duct 88 through the curved portions 82b of the gas discharge tubes 82 and, through the duct 88, admitted into the combination expansion and resonance silencer chamber 90 for being thirdly muffled therein. The exhaust gases then enter the exhaust outlet tube 94 through the apertures 96 formed therein and is discharged to the open air. The axial-flow reverse-advance centrifugal separators 78 used in the embodiment above described feature an increased dust collection efficiency although a substantial loss in the pressure of the exhaust gases passed therethrough may be invited as a result of reversing the flows in the swirling tubes thereof.

Figure 6:
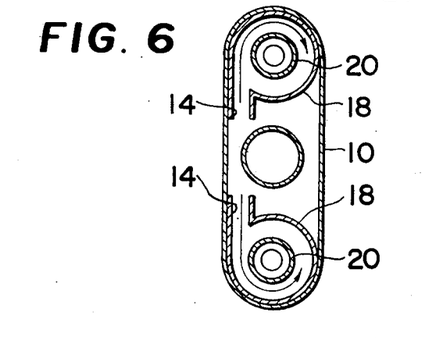
FIG. 6 is a cross sectional view taken on line IV—IV of FIG. 5.

FIGS. 5 and 6 illustrate the fourth preferred embodiment of the combination exhaust-gas cleaner and muffler according to the present invention. The embodiment herein shown is a modification of the embodiment previously described with reference to FIGS. 1 and 2 and, accordingly, those members and units of the embodiment shown in FIGS. 5 and 6 which have counterparts in the embodiment of FIGS. 1 and 2 are designated by like reference numerals. Thus, the combination exhaust-gas cleaner and muffler illustrated in FIGS. 5 and 6 has a casing 10 having a generally oval cross section as seen in FIG. 6 and an exhaust inlet tube 12 which is in fluid communication with ducts 14 which are directed substantially in parallel to a major axis of the oval section of the casing 10. The branch ducts 14 are respectively connected to tangential type centrifugal separators 16 which are positioned in parallel to a longitudinal axis of the casing 10. Each of the centrifugal separators 16 is made up of a swirling tube 18 and a gas discharge tube 20. Similarly to its counterpart shown in FIGS. 1 and 2, the swirling tube 18 consists of a cylindrical portion 18a and a conical portion 18b having a reduced end whereas the gas discharge tube 20 consists of a longitudinally inner end portion 20a located within and radially inwardly spaced apart from the cylindrical portion 18a of the swirling tube 18 and a longitudinally outer portion 20b axially projecting out of the cylindrical portion 18a of the swirling tube 18 and formed with a number of apertures 22 as shown.

The swirling tubes 18 are supported at their longitudinal ends by spaced partition members 100 and 102 which are securely connected to the casing 10. Between these partition members 100 and 102 are further positioned spaced partition members 104 and 106, thereby defining an expansion type silencer chamber 108 between the partition members 100 and 104, a particle growing chamber 110 between the partition members 104 and 106, and a gas inlet chamber 112 between the partition members 102 and 106. The silencer chamber 108 communicates on an upstream side with the exhaust inlet tube 12 and downstream with the particle growing chamber 110 through a number of apertures 104a which are formed in the partition member 104. The particle growing chamber 110 thus communicating with the downstream end of the silencer chamber 108 is in communication with the upstream end of the gas inlet chamber 112 through a number of apertures 106a which are formed in the partition member 106. The gas inlet chamber 112, in turn, is in communication with the branch ducts 14 which are tangentially open to the annular spacings 24 between the swirling tubes 18 and the gas discharge tubes 20 of the centrifugal separators 16. The particle growing chamber 110 is stuffed with a flocculent metallic material such as steel wool 114. Between the partition member 100 and an upstream end wall of the casing 10 is defined a dust collection chamber 116 into which the conical portions 18b of the swirling tubes 18 are open at their respective reduced ends. It is to be noted that the dust collection chamber 116 is so constructed to have sufficient volume to act as a resonance type silencer chamber. The exhaust inlet tube 12 extends through this dust collection chamber 116. Between the partition member 102 and a downstream end wall of the casing 10 is positioned a partition member 118, defining a combination expansion and resonance type silencer chamber 120 between the partition members 102 and 118 and a combination expansion and resonance type silencer chamber 122 between the partition member 118 and the downstream end wall of the casing 10. The gas discharge tubes 20 are in communication on one hand with the combination expansion and resonance type silencer chamber 120 through the apertures 22 formed in the longitudinally outer end portions 20b of the tubes 20 and on the other hand with the combination expansion and resonance type silencer chamber 122 through an open downstream end of the gas discharge tube 20, as shown. The combination expansion and resonance silencer type chamber 120, in turn, is opened to the atmosphere through an exhaust outlet tube 124 which extends through the combination expansion and resonance type silencer chamber 122 and which axially projects out of the casing 10. The exhaust outlet tube 124 is formed with a number of apertures 126 through which the exhaust outlet tube 124 communicates with the combination expansion and resonance type silencer chamber 122.

In operation, the exhaust gases delivered from the catalytic converter (not shown) of the previously described nature are directed into the expansion type silencer chamber 108 through the exhaust gas inlet tube 12 and is expanded and stirred in the silencer chamber 108 so that the noises borne by the exhaust gases are primarily dampened. The exhaust gases are then admitted to the particle growing chamber 110 through the apertures 104a formed in the partition member 104 so that the ultrafine particles entrained in the exhaust gases are repeatedly adhered to and peeled off the filaments of the steel wool 114 and are consequently grown into coarse particles. The exhaust gases thus carrying the coarse particles are withdrawn from the particle growing chamber 110 through the apertures 106a in the partition member 106 and enter the gas inlet chamber 112. The exhaust gases are then admitted to the branch ducts 14 and form separate streams in the ducts 14. Each of these streams is thrown in a tangential direction into the annular spacing 24 between the cylindrical portion 18a of the swirling tube 18 and the longitudinally inner end portion 20a of the gas discharge tube 20 of each of the centrifugal separators 16. The stream of the exhaust gases thus tangentially admitted into the swirling tube 18 is caused to swirl about an axis of the swirling tube 18. A centrifugal force is therefore imparted to the exhaust gases advancing toward the reduced end of the conical portion 18b of the swirling tube 18 so that the coarse particles entrained in the vortex flow of the exhaust gases are urged radially outwardly toward an inner peripheral surface of the swirling tube 18. The particles are thus separated from the exhaust gases, moved on the inner peripheral surface of the conical portion 18b of the swirling tube 18, and finally discharged into the dust collection chamber 116 from the reduced end of the conical portion 18b of the tube 18. As a result of the development of the vortex flow in the swirling tube 18, a localized pressure drop is brought about along the axis of the swirling tube 18 so that the exhaust gases advancing toward the reduced end of the conical portion 18b of the swirling tube 18 is turned back as indicated by an arrow in FIG. 5 and is thus admitted into the gas discharge tube 20. During the turning back proceeding of the stream of the exhaust gases in the swirling tube 18, the noises of the exhaust gases are secondarily muffled by dampening effect of the dust collection chamber 116. The exhaust gases thus cleared of the dust particles are admitted in part into the combination expansion and resonance type silencer chamber 120 through the apertures 22 in the gas discharge tube 20 and in part into the combination expansion and resonance type silencer chamber 122 through the open downstream end of the discharge tube 20. The gases thus debouched into the combination expansion and resonance type silencer chamber 120 are then admitted direct into the exhaust outlet tube 124 whereas the gases entering the combination expansion and resonance silencer type chamber 122 are admitted into the exhaust outlet tube 124 through the apertures 126 formed in the outlet tube 124. The noises borne by the exhaust gases forced out of the two gas discharge tubes 20 are dampened partly in the combination expansion and resonance type silencer chamber 120 and partly in the combination expansion and resonance type silencer chamber 122. The exhaust gases are thereafter discharged to the open air from the exhaust outlet tube 124. The stream of the exhaust gases in each of the gas discharge tubes 20 is divided, when discharged therefrom, into two separate streams flowing through the two silencer chambers 120 and 122 and, as a consequence, the resistances to which the streams of exhaust gases flowing through the centrifugal separators 16 is reduced to facilitate formation of the vortex flows and establishment of reverse flows of the exhaust gases in the swirling tubes 18.

The steel wool 114 incorporated into the particle growing chamber 110 is preferably formed of stainless steel in view of the resistance to heat and abrasion of the material and each of the filaments of the steel wool 114 is preferably so formed as to have a triangular, rectangular or otherwise sharply edged cross section adapted to facilitate adhesion and separation of the fine dust particles to and from the individual filaments. For this reason and with a view to increasing the heat resistance of the steel wool 114, the filaments of the steel wool 114 should preferably have relatively large thickness. For the purpose, moreover, of facilitating the exhaust gases to rapidly advance between the interstices between the filaments of the steel wool 114 and to uniformly distribute throughout the growing chamber 110, it is preferable that the filaments be wadded or interwound relatively coarsely in the particle growing chamber 110. This will be conductive to enabling the dust particles to be adhered to and separated from the filaments of the steel wool 114 and preventing an undue increase of the exhaust back pressure. In the embodiment of the combination exhaust-gas cleaner and muffler above described, the casing 10 should be preferably so positioned as to have the branch ducts 14 leading to the swirling tubes 18 located at the bottom of the casing 10 for providing an increased dust collection efficiency. This is because of the fact that the dust particles which have been grown coarse tend to fall downwardly by their own weight when subjected to vibrations transferred from the silencer chambers 108, 116, 120 and 122.

FIG. 7 illustrates the fifth preferred embodiment of the combination exhaust-gas cleaner and muffler according to the present invention. The fifth embodiment is a modified version of the second embodiment illustrated in FIG. 3 and, thus, members and units of the fifth embodiment having counterparts in the embodiment shown in FIG. 3 are designated by like reference numerals. Different from the second embodiment, however, the fifth embodiment shown in FIG. 7 has spaced partition members 128 and 130 which are positioned intermediate between the upstream end wall of the casing 40 and the partition member 46 defining the dust collection chamber 60. A particle growing chamber 132 is thus defined between these partition members 128 and 130 and is stuffed with a flocculent metallic material such as steel wool 134. The partition members 128 and 130 are formed with apertures 128a and 130a, respectively, so that communication is provided across the particle growing chamber 132. On a portion, facing the opening of the exhaust gas inlet tube 42, of the partition member 128 is attached a deflector plate 140 for the reasons which will be described herein later. Between the apertured partition member 128 and the upstream end wall of the casing 40 is defined an expansion type silencer chamber 136 (which corresponds to the silencer chamber 44 in the second embodiment shown in FIG. 3) and between the apertured partition member 130 and the partition member 46 next to the dust collection chamber 60 is defined a gas inlet chamber 138. The expansion type silencer chamber 136 is in communication on an upstream side with the exhaust inlet tube 42 and on downstream side with the particle growing chamber 132 through the apertures 128a in the partition member 128. On the other hand, the gas inlet chamber 138 is in communication on an upstream side with the particle growing chamber 132 through the apertures 130a in the partition member 130 and with the upstream ends of the swirling tubes 50 of the centrifugal separators 48 through the flow-directing or swirling blades 52. The centrifugal separators 48 are of the axial-flow forward advance types, similar to their counterparts of the embodiment shown in FIG. 3. The gas discharge tubes 54 of the centrifugal separators 48 are, in the embodiment herein shown, directly open into the combination expansion and resonance silencer chamber 66 which is separated from the dust collection chamber 60 by means of a partition member 142 secured to the casing 40. The dust collection chamber 60 is so arranged to act as a resonance type silencer chamber with increased noise dampening effect. The fifth embodiment illustrated in FIG. 7 is thus void of the resonance type silencer chamber 62 provided in the embodiment shown in FIG. 3.

In operation, the exhaust gases delivered from the catalytic converter (not shown) of the exhaust system of the previously described nature are directed into the expansion type silencer chamber 136 through the exhaust inlet tube 42 and are expanded and stirred therein so that the noises borne by the exhaust gases are primarily dampened. The exhaust gases in the silencer chamber 136 are uniformly distributed by means of the deflector plate 140 and are admitted to the particle growing chamber 132 through the apertures 128a in the partition member 128. The ultrafine particles entrained in the exhaust gases are thus repeatedly captured by and separated from the filaments of the steel wool 134 and are thereby grown into coarse particles. The exhaust gases are then passed through the apertures 130a in the partition member 130 into the gas inlet chamber 138, from which the exhaust gases are directed to the swirling tubes 50 of the centrifugal separators 48. The stream of exhaust gases entering each of the swirling tubes 50 of each of the centrifugal separators 48 is given a swirling motion by means of the flow-directing or swirling blades 52 located at the inlet end of the swirling tube 50 so that a vortex flow is built up in the swirling tube 50 of the centrifugal separator 48. The coarse dust particles entrained in the vortex flow is thus given a centrifugal force and is thereby urged toward the inner peripheral surface of the swirling tube 50. The dust particles are moved on the inner peripheral surface of the swirling tube 50 as the stream of exhaust gases advances in the swirling tube 50 and is finally discharged into the dust collection chamber 60 defined between the partition members 46 and 142. The stream of the exhaust gases advances from the swirling tube 50 into the gas discharge tube 54. During this proceeding of the stream of the exhaust gases, the noises borne by the exhaust gases are secondarily dampened by the dust collection chamber 60 acting as the resonance type silencer. The exhaust gases introduced from the gas discharge tube 54 into the combination expansion and resonance type silencer chamber 66 are thirdly dampened. The exhaust gases are then admitted to the exhaust outlet tube 68 through the apertures 68a formed therein and are thereafter emitted to the open air through the outlet tube 68.

The material, thickness and cross section of the filaments forming the steel wool 134 may be selected in such a manner as has been discussed in connection with the embodiment illustrated in FIGS. 5 and 6.

FIG. 8 shows the sixth preferred embodiment of the combination exhaust-gas cleaner and muffler according to the present invention. The embodiment herein shown is a modification of the third embodiment illustrated in FIG. 4 and accordingly like reference numerals designate corresponding members and units in both figures. The combination exhaust-gas cleaner and muffler shown in FIG. 8 thus comprises a casing 70 having an exhaust inlet tube 72 which leads from the catalytic converter (not shown) of the previously described nature. The casing 70 has accommodated therein a pair of axial-flow reverse-advance centrifugal separators 78 which are positioned in parallel to a longitudinal axis of the casing 70. Each of the centrifugal separators 78 consists of a swirling tube 80 having cylindrical and conical portions 80a and 80b, a gas discharge tube 82 having longitudinally inner and outer portions 82a and 82b, and flow-directing or swirling blades 86 which are located in an annular spacing 84 between the cylindrical portion 80a of the swirling tube 80 and the longitudinally inner portion 82a of the gas discharge tube 82, similar to the centrifugal separators of the embodiment illustrated in FIG. 4.

The exhaust inlet tube 72 in the embodiment shown in FIG. 8 opens into an expansion type silencer chamber 144 which is defined between a partition member 146 spaced apart from an upstream end wall of the casing 70 and a partition member 148 which is formed with a number of apertures 148a. The expansion type silencer chamber 144 is in communication on an upstream side with a particle growing chamber 150 which is defined between the apertured partition member 148 and a partition member 152 which is spaced apart from the former and which is also formed with a number of apertures 152a. The particle growing chamber 150 is stuffed with a flocculent metallic material such as steel wool 154 and is in communication with a gas inlet chamber 156 through the apertures 152a in the partition member 152. The gas inlet chamber 156 is defined between the apertured partition member 152 and a partition member 158 which is positioned intermediate between the apertured partition member 152 and a downstream end wall of the casing 70. The gas inlet chamber 156 thus communicating on an upstream side with the particle growing chamber 150 is in communication on a downstream side with the annular spacings 84 each formed between the cylindrical portion 80a of the swirling tube 80 and the longitudinally inner portion 82a of the gas discharge tube 82. The gas discharge tubes 82 are open at their forward ends into a combination expansion and resonance type silencer chamber 160 which is defined between the partition member 158 and the downstream end wall of the casing 70. An exhaust outlet tube 162 axially projects from the partition member 158 and, through the combination expansion and resonance type silencer chamber 160, out of the casing 70. The exhaust outlet tube 162 is formed with a number of apertures 164 through which communication is provided between the silencer chamber 160 and the exhaust outlet tube 162. Between the upstream end wall of the casing 70 and the partition member 146 next to the expansion type silencer chamber 144 is defined a dust collection chamber 168 into which the conical portions 80b of the swirling tubes 80 of the centrifugal separators 78 are open at their respective reduced ends as shown. The dust collection chamber 168 is so arranged to have sufficient volume to act as a resonance type silencer as previously described in the other embodiments.

In operation, the exhaust gases delivered from the catalytic converter (not shown) of the exhaust system are directed into the expansion type silencer chamber 144 through the exhaust inlet tube 72 and are expanded and stirred in the silencer chamber 144 so that the noises in the exhaust gases are primarily dampened. The exhaust gases are then admitted into the particle growing chamber 150 through the apertures 148a formed in the partition member 148, so that the fine dust particles entrained in the exhaust gases are grown into course particles by means of the filaments forming the steel wool 154 in the growing chamber 150. The exhaust gases carrying the grown dust particles are admitted into the gas inlet chamber 156 through the apertures 152a in the partition member 152 and, from the gas inlet chamber 156, into the swirling tubes 80 of the centrifugal separators 78 through the annular spacings 84 between the cylindrical portions 80a of the swirling tubes 80 and the longitudinally inner portions 82a of the gas discharge tubes 82. The exhaust gases thus entering the swirling tubes 80 are given swirling motions by means of the flow-directing or swirling blades 86 located in the annular spacings 84 so that a vortex flow of exhaust gases is built up in each of the swirling tubes 80. The relatively course dust particles entrained in the vortex flow are accordingly urged toward an inner peripheral surface of the swirling tube 80 under the influence of a centrifugal action imparted thereto and are moved toward the reduced end of the conical portion 80b of the swirling tube 80 as the stream of the exhaust gases advances in the swirling tube 80. The dust particles are thus finally withdrawn into the dust collection chamber 168 from the reduced end of the swirling tube 80 and, on the other hand, the stream of the exhaust gases is caused to change its direction of flow as indicated by an arrowhead in FIG. 8. During the proceeding of the stream of the exhaust gases, noises borne by the exhaust gases are secondarily dampened by the dust collection chamber 168. The stream of the exhaust gases cleared of the dust particles is directed into the gas discharge tube 82 and from the gas discharge tube 82 into the combination expansion and resonance type silencer chamber 160 where the noises in the exhaust gases are thirdly dampened out. The exhaust gases then enter the exhaust outlet tube 162 through the apertures 164 formed therein and are discharged to the open air. The material, cross sectional configuration and thickness of the filaments forming the steel wool 154 may be selected in a manner which has been previously described in connection with the embodiment shown in FIGS. 5 and 6.

It will now be appreciated from the foregoing description that, because of the fact that each of the dust collection chambers provided in the previously mentioned embodiments of this invention is in constant communication with the centrifugal separators and across the separators with the passageways of the exhaust gases, the dynamic pressure of the exhaust gases is transferred in a pulsating fashion to the dust collection chamber and is dampened in the particular chamber. The dust collection chamber thus not only plays an important role in collecting and storing the dust particles but serves to dampen the energy of the dynamic pressure and provides a muffling effect in a resonant manner.

Two centrifugal separators are positioned in parallel in each of the embodiments thus far described. Such a separator configuration will provide advantageous for the purpose of preventing an undue increase of the exhaust back pressure through reduction of the resistance applied to the streams of exhaust gases passed through the separators and preventing reverse flow of the dust particles from the dust collection chamber as would otherwise be caused by reason of turbulent flows which may be created if the streams of the exhaust gases are slowed down in the separators. In the embodiment using the centrifugal separators of the type in which the streams of exhaust gases are caused to change their directions of flow when entering the gas discharge tubes as in the first, third, fourth and sixth embodiments, the provision of the two centrifugal separators will further prove advantageous for the purpose of facilitating the streams of exhaust gases to turn backwardly in the swirling tubes. Where desired, however, only one or otherwise more than two centrifugal separators may be incorporated into the combination exhaust-gas cleaner and muffler according to the present invention. It is, moreover, noted that the incorporation of the centrifugal separator or separators will not result in a significant increase in the overall size of the combination exhaust-gas cleaner and muffler because the space or spaces surrounding the separator or separators can be utilized as the silencer chamber, the dust collection chamber or the particle growing chamber as the case may be.

The dust particles emitted from the catalytic converter using the granular catalyst usually have grain sizes which are larger than those of the dust particles which are intrinsically contained in the exhaust gases from the engine. Thus, the dust particles entrained in the exhaust gases delivered from the catalytic converter can be practically perfectly removed from the exhaust gases through use of the centrifugal separator or separators in the arrangement herein proposed. As compared with the prior art combination cleaner and muffler which uses a filter, no such problems as the deterioration of the filter due to the heat of the exhaust gases, the clogging of the filter with the dust and the resultant increase in the exhaust back pressure are encountered in the combination exhaust-gas cleaner and muffler according to the present invention, providing ease of maintenance and servicing which would otherwise be required for the exchange of the deteriorated filter or the cleaning of the clogged filter.

Figure 9:
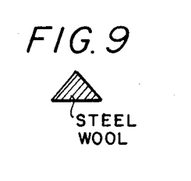
FIGS. 9 and 10 are respective views of a cross section of differently shaped steel wool which can be used in the particle growing chambers.
Figure 10:
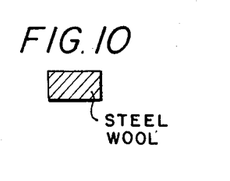

FIGS. 9 and 10 show respectively the cross-sectional shape of steel wool which may be used in the particle growing chambers 110 (FIG. 5), 132 (FIG. 7) and 150 (FIG. 8). FIG. 9 shows steel wool of triangular cross section and FIG. 10 shows steel wool of rectangular cross section.

What is claimed is:

1. A combined assembly of an exhaust-gas cleaner and a muffler, which assembly is to be connected to an exhaust port of a catalytic converter of an internal combustion engine system for removing dust particles discharged from the catalytic converter and simultaneously dampening of noises borne by exhaust gases dicharged from the combustion engine, the assembly comprising:

an exhaust gas inlet tube located immediately downstream of and in communication with the catalytic converter so that a stream of exhaust gases entraining dust particles is admitted into said exhaust inlet tube from the catalytic converter;

two identical centrifugal separators located downstream of said exhaust inlet tube for imparting centrifugal force to the stream of said exhaust gases being passed from said exhaust inlet tube into the centrifugal separators and thereby separating the dust particles from the exhaust gases, said centrifugal separators being arranged parallel to each other and aligned in the same direction, each said separators including a gas inlet opening which is in fluid communication with the exhaust inlet tube for admitting the stream of the exhaust gases thereinto from the exhaust inlet tube and a respective dust discharge opening for discharging from the centrifugal separator the dust particles separated from the exhaust gases in the separator and a respective gas discharge opening for discharging from the centrifugal separator the stream of the exhaust gases cleaned of the dust particles;

a single resonance-type silencer dust collection chamber in fluid communication with both of said centrifugal separators through the corresponding said dust discharge opening for depositing therein the dust particles discharged from said centrifugal separators;

a first silencer chamber location downstream of said centrifugal separators and in fluid communication therewith via said gas discharge openings for dampening noises borne by the exhaust gases;

an exhaust outlet tube located downstream of and in fluid communication with said centrifugal separators via said first silencer chamber so that the stream of exhaust gases cleaned of the dust particles and discharged from both of said gas discharge openings of said centrifugal separators is admitted into said exhaust outlet tube and finally discharged into the open air; and at least one additional silencer chamber in fluid communication with said exhaust outlet tube and downstream of said first silencer chamber for dampening noises borne by the exhaust gases.

2. A combined assembly as claimed in claim 1, in which each of said centrifugal separators is of the tangential type, and the assembly includes means for directing the stream of exhaust gas from said exhaust inlet tube tangentially into each said separator via its said inlet opening, and in which the gas and dust discharge openings of each said separator are axially spaced apart from and directed in opposite directions to one another.

3. A combined assembly as claimed in claim 1, in which each of said centrifugal separators is an axial-flow forward-advance separator in which its said gas inlet and discharge openings are axially spaced apart from one another and in which its said dust discharge opening is located radially outwardly of its said gas discharge opening.

4. A combined assembly as claimed in claim 1, including a third silencer chamber positioned between said exhaust inlet tube and said separators, said separators being in fluid communication with said exhaust gas inlet tube via said third silencer chamber, and wherein said first silencer chamber is positioned immediately downstream of the gas discharge opening of each of the centrifugal separators.

5. A combined assembly as claimed in claim 4, in which said third silencer chamber is of the expansion type and said second silencer chamber is of the combined expansion and resonance type.

6. A combined assembly as claimed in claim 4, in which said first silencer chamber is of the expansion type and said additional silencer chamber is of the resonance type.

7. A combined assembly as claimed in claim 4, in which said third silencer chamber is of the expansion type.

8. A combined assembly as claimed in claim 1, in which said at least one additional silencer chamber comprises a second silencer chamber positioned circumferentially about at least a portion of said exhaust outlet tube.

9. A combined assembly as claimed in claim 1, in which at least a portion of each of said centrifugal separators extend through said at least one additional silencer chamber.

10. A combined assembly as claimed in claim 1, in which said first silencer chamber is of the expansion type and said additional silencer chamber is of the resonance type.

11. A combined assembly as claimed in claim 1, further comprising a particle growing chamber which is located intermediate between said exhaust inlet tube and said gas inlet opening of each of said centrifugal separators and which is stuffed with a flocculent metallic material and including apertured partition members which are located at inlet and outlet ends of said particle growing chamber.

12. A combined assembly as claimed in claim 11, in which said flocculent metallic material is steel wool.

13. A combined assembly as claimed in claim 12, in which said steel wool is formed of stainless steel.

14. A combined assembly as claimed in claim 12, in which said steel wool is composed of filaments each having an edged cross section.

15. A combined assembly as claimed in claim 14, in which each of said filaments has a generally rectangular cross section.

16. A combined assembly as claimed in claim 14, in which each of said filaments has a generally triangular cross section.

17. A combined assembly as claimed in claim 11, in which each of said centrifugal separators is of the tangential type.

18. A combined assembly as claimed in claim 11, further comprising a deflector plate which is attached to said apertured partition member located at the inlet end of said particle growing chamber and which is located substantially in line with the exhaust inlet tube.

19. A combined assembly as claimed in claim 11, in which said centrifugal separators are at least in part surrounded by said particle growing chamber.

20. A combined assembly as claimed in claim 1, in which said centrifugal separators are substantially completely surrounded by said dust collection chamber.

21. A combined assembly as claimed in claim 1, in which said centrifugal separators are at least in part surrounded by said dust collection chamber.

* * * * *